United States Patent
LeBlanc et al.

(10) Patent No.: US 7,452,091 B2
(45) Date of Patent: Nov. 18, 2008

(54) SEARCHLIGHT FEATURING BAYONET MOUNTING SYSTEM WITH 2-SPEED JOYSTICK ROTATIONAL OPERATION

(75) Inventors: Kenneth J. LeBlanc, Gloucester, MA (US); Stephen B. Boyd, Merrimac, MA (US); Joseph M. Gordon, Manfield, MA (US); Thomas G. Parent, Providence, RI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 208 days.

(21) Appl. No.: 11/255,591

(22) Filed: Oct. 21, 2005

(65) Prior Publication Data

US 2008/0019116 A1    Jan. 24, 2008

Related U.S. Application Data

(60) Provisional application No. 60/621,136, filed on Oct. 22, 2004.

(51) Int. Cl.
    *F21V 33/00*    (2006.01)
(52) U.S. Cl. .................... 362/85; 362/253; 362/382

(58) Field of Classification Search .............. 362/253, 362/85, 382, 137, 466, 234, 249, 441
    See application file for complete search history.

(56) References Cited

U.S. PATENT DOCUMENTS

| | | | |
|---|---|---|---|
| 5,050,250 A | 9/1991 | Morral Gispert | |
| 5,167,041 A | 12/1992 | Burkitt, III | |
| 5,228,770 A * | 7/1993 | Brunson | 362/194 |
| 5,347,664 A | 9/1994 | Hamza et al. | |
| 5,499,406 A | 3/1996 | Chalberg et al. | |
| 5,677,669 A * | 10/1997 | Walkley et al. | 340/473 |
| 5,725,359 A | 3/1998 | Dongo et al. | |
| 5,799,339 A | 9/1998 | Perry et al. | |
| 5,978,981 A | 11/1999 | Nelson | |
| 6,008,842 A | 12/1999 | Nagata | |
| 6,038,712 A | 3/2000 | Chalberg et al. | |
| 6,098,648 A | 8/2000 | Bertoia | |
| 6,760,931 B1 | 7/2004 | Mattson, Jr. et al. | |
| 6,770,194 B1 | 8/2004 | McGrath | |
| 6,786,622 B1 * | 9/2004 | Rice | 362/362 |
| 2005/0248930 A1 * | 11/2005 | Naval et al. | 362/85 |

* cited by examiner

*Primary Examiner*—Bao Q Truong (57) ABSTRACT

The present invention provides a new and unique searchlight featuring a bayonet/security locking and mounting system, or a controller having a center home position, or a controller having a 2-speed joystick, or some combination of one or more of these features.

9 Claims, 6 Drawing Sheets

Figure 1: The Searchlight

Figure 2: The Searchlight Controller and/or Controller Pad

Figure 2A: 233 SEARCHLIGHT CONTROLLER

Two-speed operation:
Slow speed for first (3-5) seconds
Fast speed after first (3-5) seconds
Release of control resets operation to slow speed.

Activates (20) degree left/right sweep feature in spot/slow mode. Activates motors and lamps if not already on. Second press deactivates sweep function. Lamp stays on.

Activates S.O.S. signaling in current lamp head position after (2) second hold. Second press activates (30) degree incremental rotation and signaling function. Third press cancels signaling and rotation. Light stays on.

Switches to spot mode

Switches to flood mode

Press and hold for (1) second to return light head to centerline. If lamp is "on" it will remain on after light centers. If light is off, the lamp head will center without activating the lamps. Power to the motors will then turn "off" at the end of the movement.

Power to lamps and motors in spot mode

Kills power to lamps and motors. Back lighting is green when off (same as other buttons; amber with power "on").

Additional Features:
1. Up to two remote stations
2. 12/24 volt operation
3. Reverse polarity protected
4. Resetable internal fusing
5. Rotation speed: Fast 25 - 30 degrees per second, horizontal; Slow 15 - 20 degrees per second, vertical. (speed varies with voltage)
6. Waterproof

Figure 2B

2-Speed Joystick

Figure 3: The Searchlight Controller Module

Figure 4d

Figure 5: The Searchlight Up/Down and Left/Right Motorized Assembly

SEARCHLIGHT FEATURING BAYONET MOUNTING SYSTEM WITH 2-SPEED JOYSTICK ROTATIONAL OPERATION

CROSS-REFERENCE TO RELATED APPLICATION

This application is related to and claims benefit to provisional application Ser. No. 60/621,136, filed Oct. 22, 2004, which is hereby incorporated by reference in its entirety.

BACKGROUND OF THE INVENTION

Technical Field

The present invention relates to a searchlight, and more particularly to a searchlight for a watercraft or other suitable vehicle or vessel.

SUMMARY OF THE INVENTION

The present invention provides a new and unique searchlight featuring a controller having a 2-speed joystick and a center home position, a bayonet/security locking and mounting system, or some combination of one or more of these features.

The controller having the 2-speed joystick allows a searchlight selection of slow and fast rotational options to be chosen separately from spot/flood beam options. For example, the two-speed joystick allows for the searchlight selection of the slow and fast rotational options, while a first separate button or key allows for providing the searchlight selection of a spot beam option, and a second separate button or key allows for providing the searchlight selection of a flood beam option. Embodiments are also envisioned in which one button controls both the spot/flood beam options.

The "center home" position feature provides a one-touch controller pad that returns the searchlight to its customary forward pointing/on centerline position after use.

The bayonet mounting/security locking system features a base, a mounting plate and at least one locking bolting. The base is coupled to the light and has at least one mounting member. The mounting plate is for coupling the base to the device such as a boat and has at least one aperture for receiving the at least one mounting member. Each of the at least one locking bolt is coupled to a respective one of the at least one mounting member, the at least one locking bolt requiring a special matching locking wrench to tighten and loosen the same making theft of the light from the device substantially more difficult.

BRIEF DESCRIPTION OF THE DRAWING

The drawing includes the following Figures, that are not necessarily drawn to scale:

FIG. 2, including

FIG. 4, including

BEST MODE FOR CARRYING OUT THE INVENTION

Figure 1:
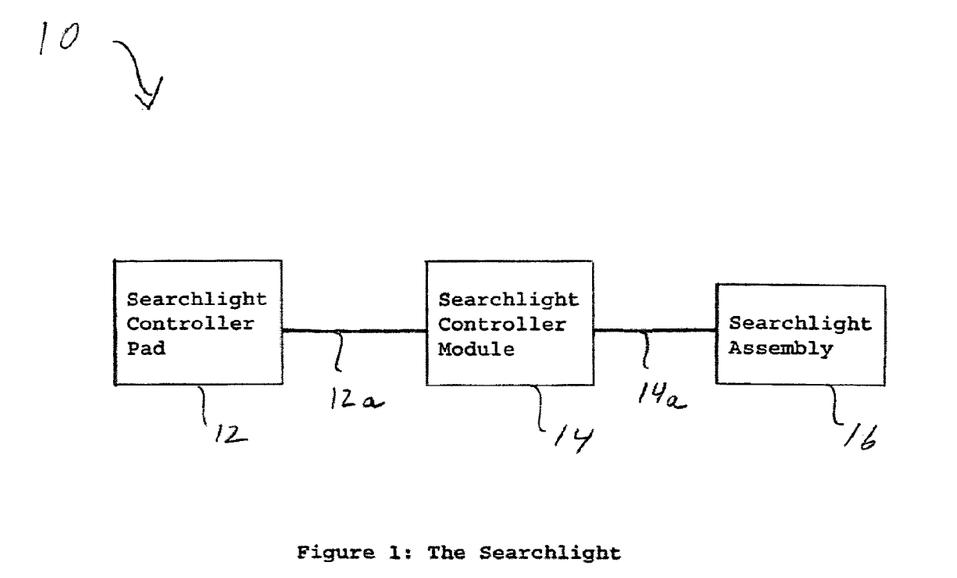
FIG. 1 is a block diagram of the a search light according to the present invention.

FIG. 1: The Searchlight

FIG. 1 shows a searchlight generally indicated as 10 according to the present invention, having a search controller 12 (also known herein as a searchlight controller pad), a searchlight controller module 14 and a searchlight assembly 16.

Figures 2A, 2B:
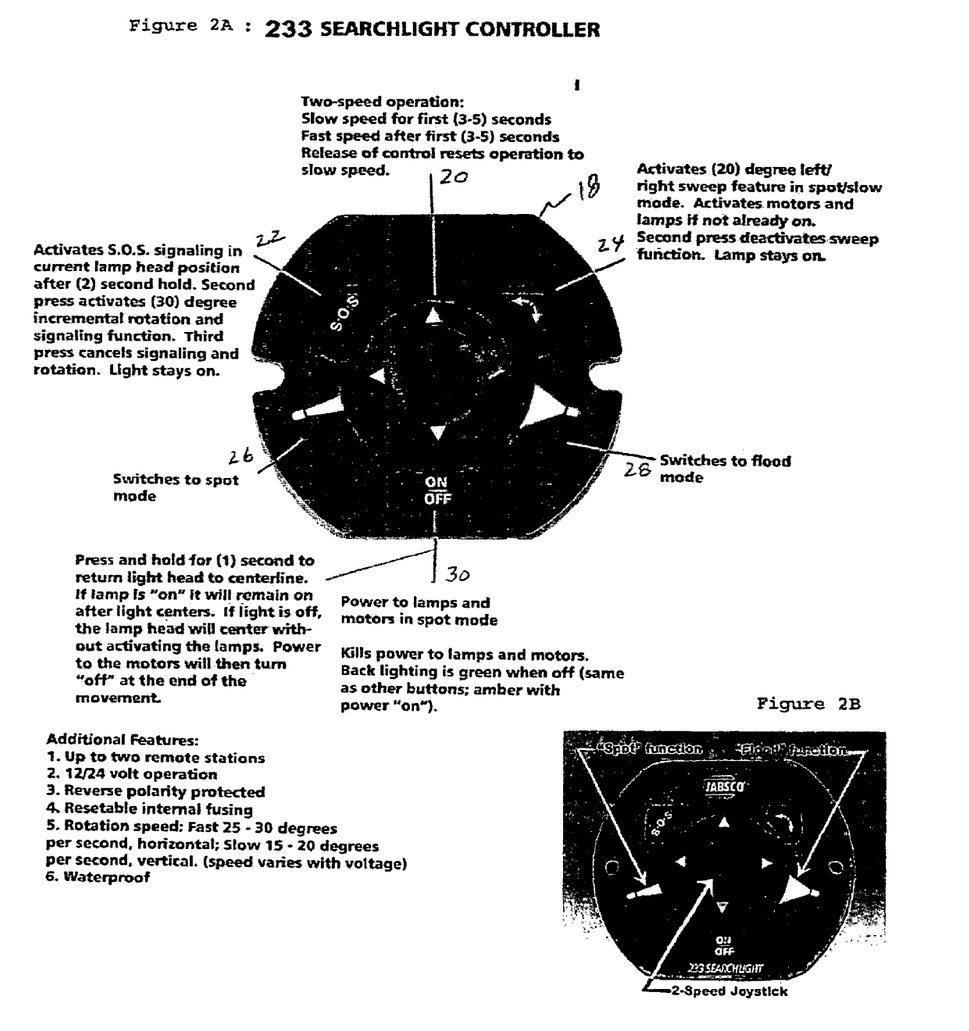
FIGS. 2a and 2b, show diagrams of the search light controller and/or searchlight controller pad shown in FIG. 1 according to the present invention.

In operation, the search controller 12, which is described in greater detail in FIG. 2, responds to manual user inputs for controlling the basic operation of the searchlight according to the present invention, including turning the searchlight on/off, moving the searchlight up/down and left/right, moving the searchlight fast/slow, providing SOS signaling and/or one-touch center control, providing spotlight or floodlight functionality, etc., consistent with that shown and described herein, and provides a searchlight controller signal along the line 12a to the searchlight controller module 14 containing information about the manual user inputs for controlling the basic operation of the searchlight.

Figure 3:
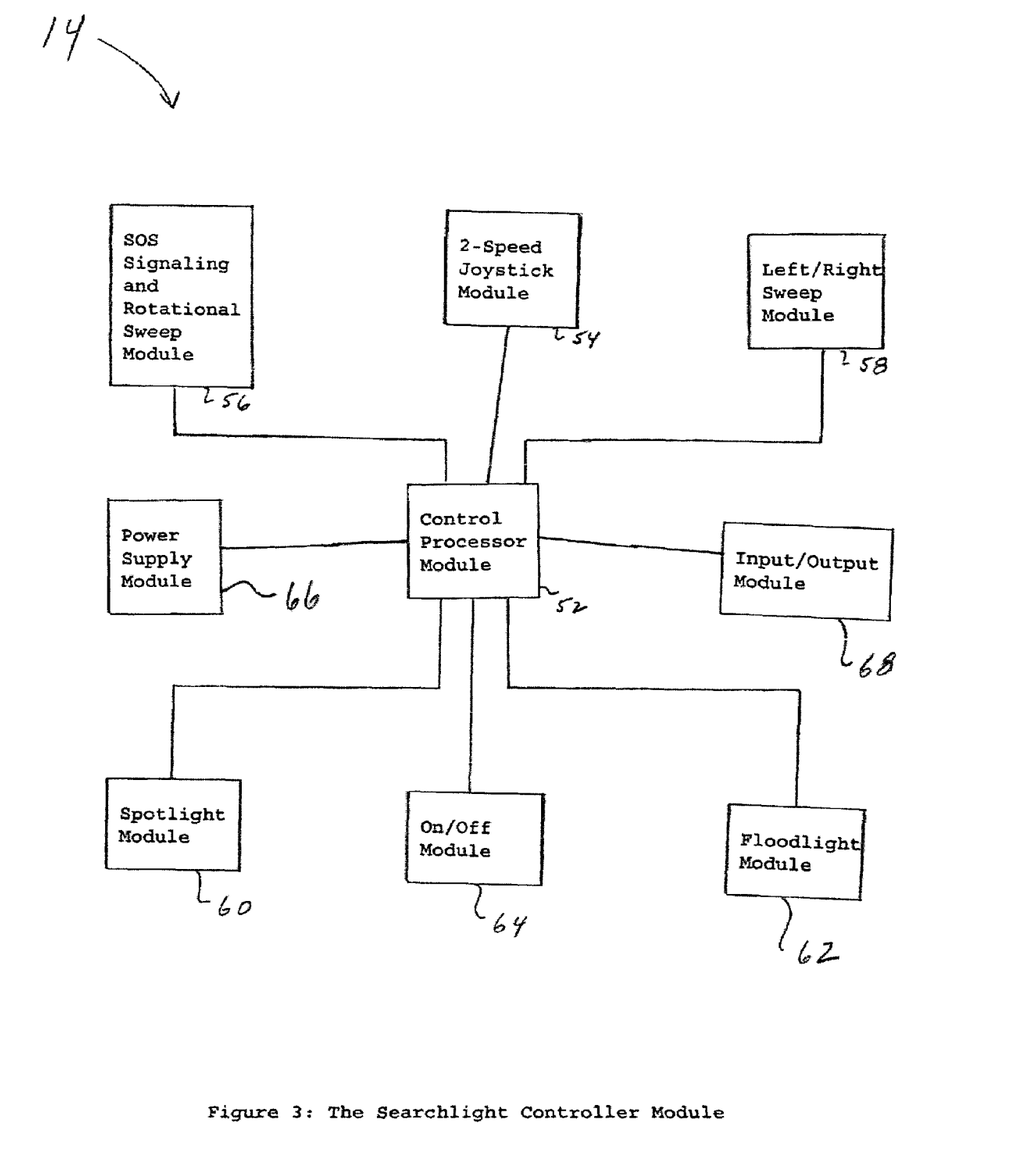
FIG. 3 shows a block diagram of the searchlight controller module shown in FIG. 1 according to the present invention.

The searchlight controller module 14 which is described in greater detail in FIG. 3, responds the searchlight controller signal along the line 12a, processes this signal, and provides a searchlight controller module signal along the line 14a to the searchlight assembly 16 containing information about commands for electromechanically controlling the basic operation of the searchlight consistent with that shown and described herein.

Figures 4A, 4B, 4C:
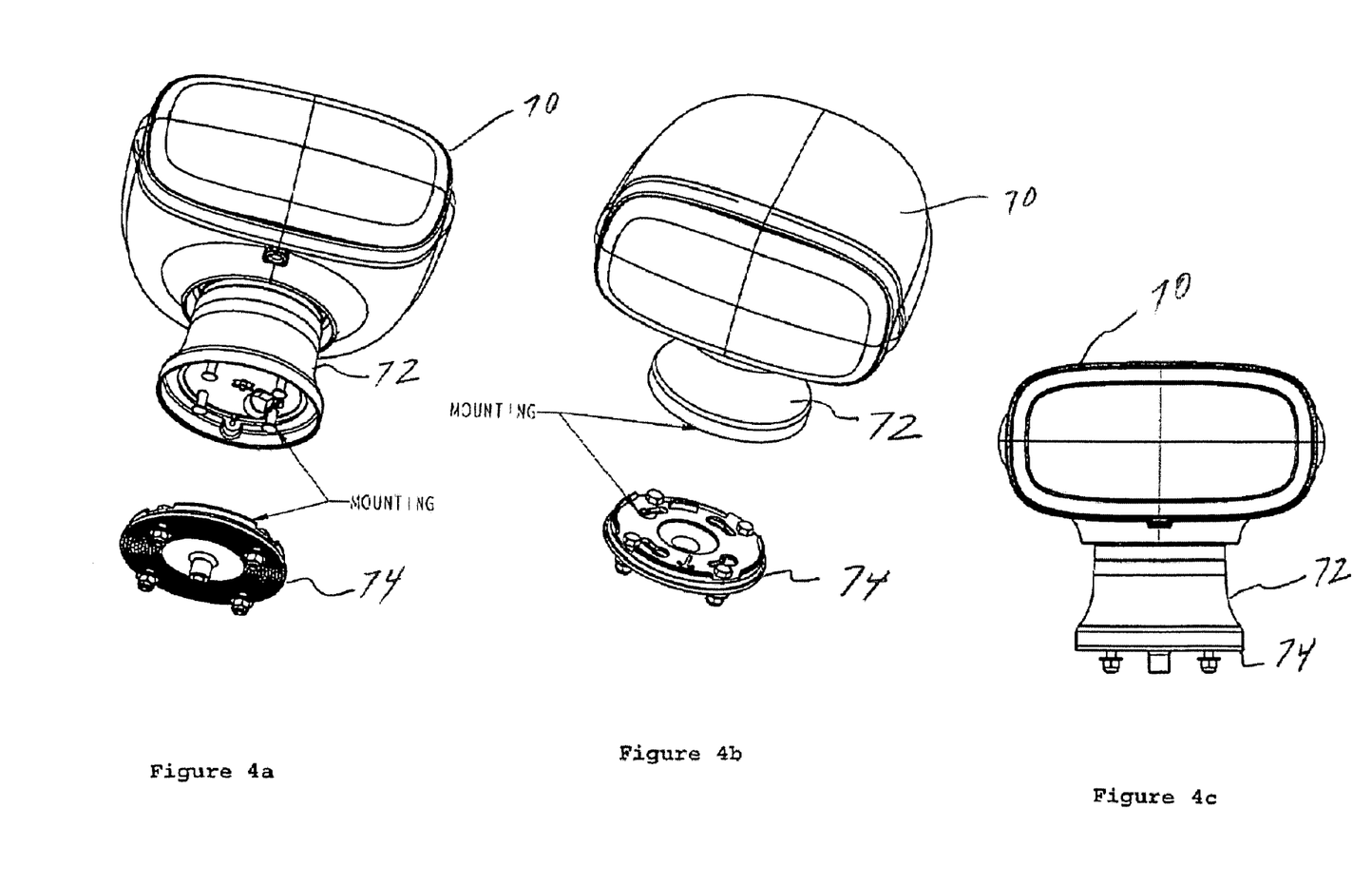
FIGS. 4a, 4b, 4c, 4d, are diagrams of the searchlight assembly according to the present invention, including FIGS. 4d which is an exploded view of the search light assembly.
Figure 4D:
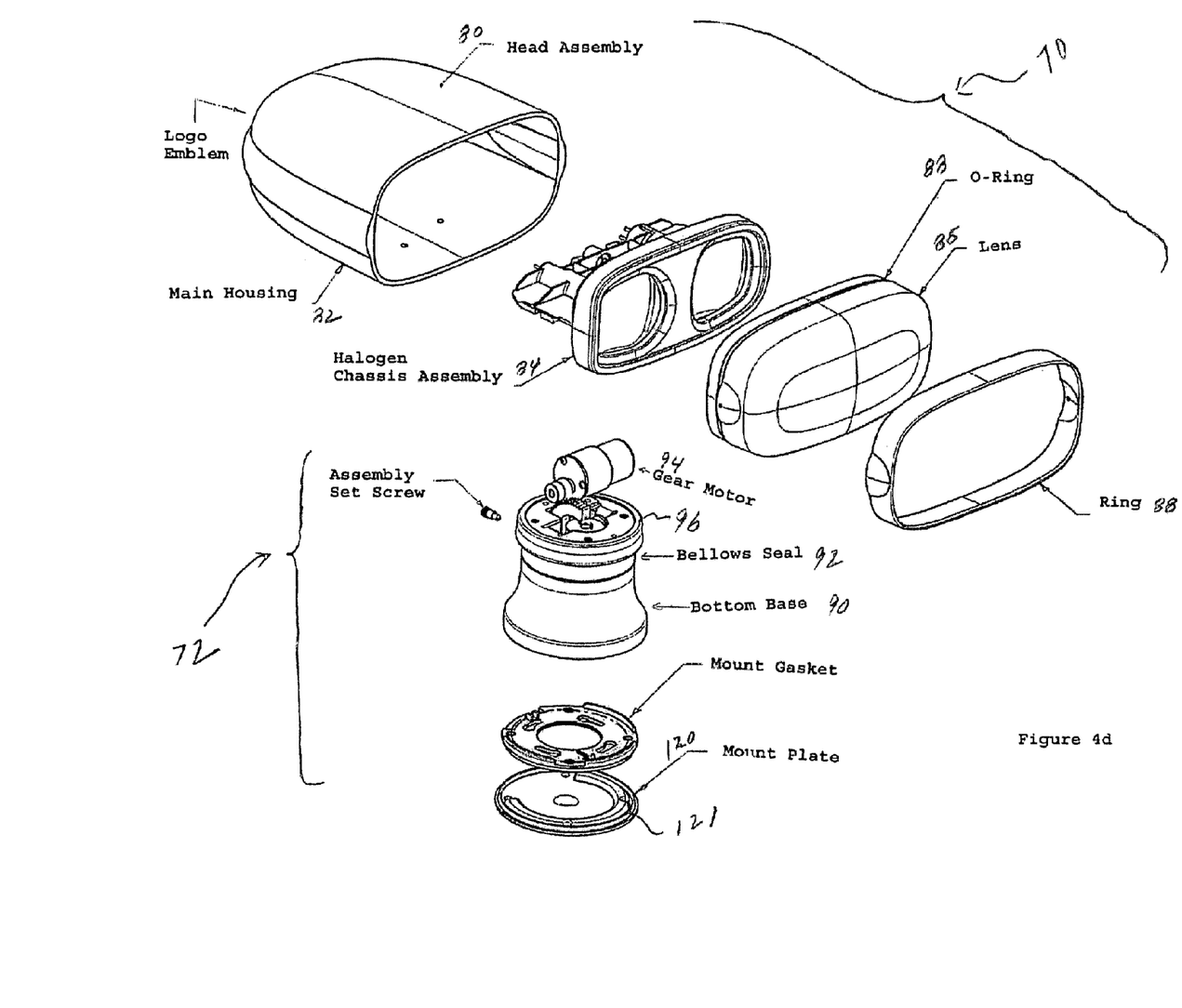
Figure 5:
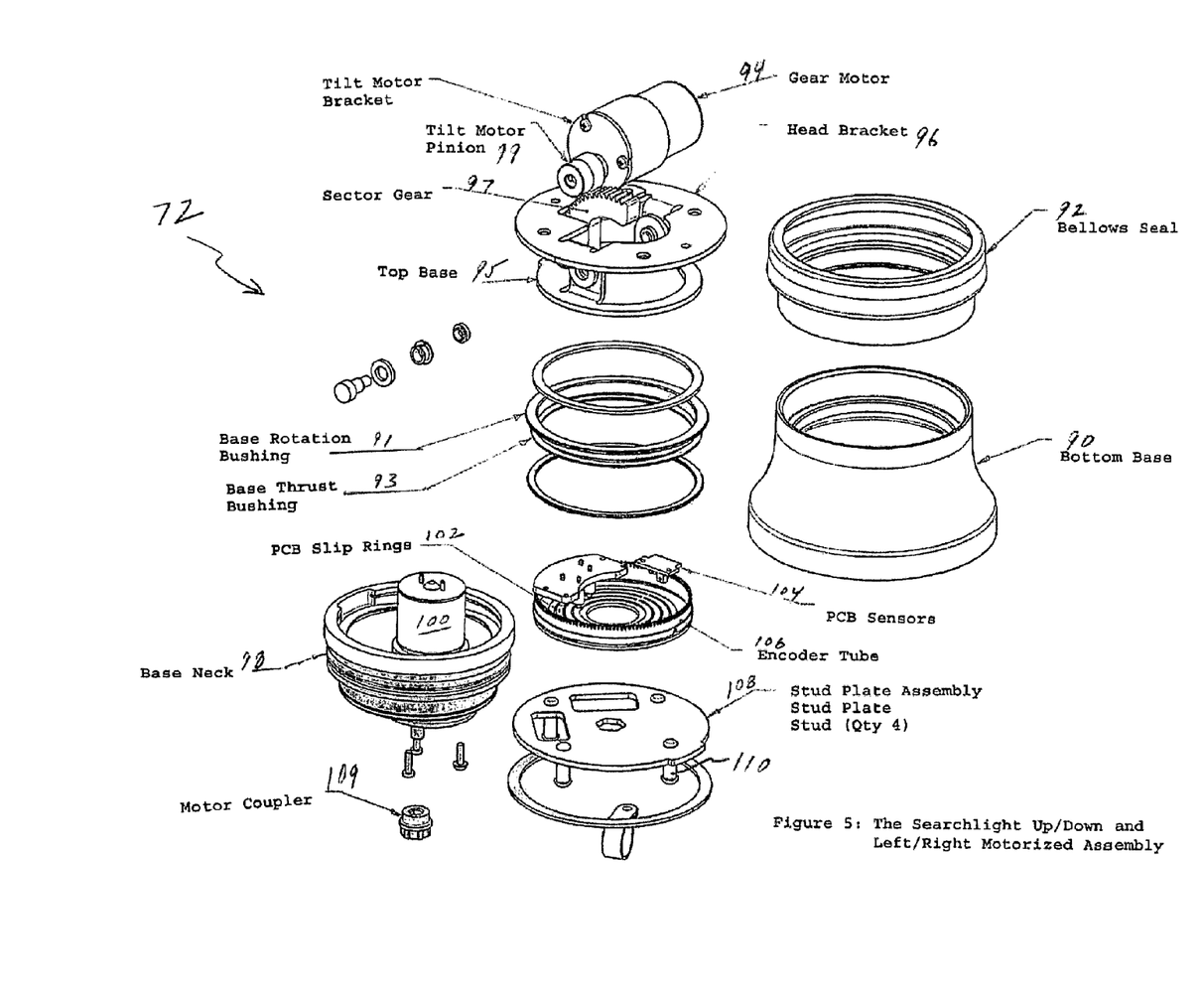
FIG. 5 is an exploded view of the searchlight up/down and left/right motorized assembly shown, for example, in FIG. 4d according to the present invention.

The searchlight assembly 16 which is described in greater detail in FIGS. 4-5, responds to the searchlight controller module signal along the line 14a and turns the searchlight on/off, moves the searchlight up/down and left/right, fast/slow, provides SOS signaling, provides the one-touch centerline, provides spotlight or floodlight functionality, etc., consistent with that shown and described herein.

FIG. 2: The Searchlight Controller Pad 12

FIG. 2 shows the searchlight controller pad 12 in FIG. 1 in greater detail, including a keypad 18 having a 2-speed joystick 20, an SOS key 22, a sweep key 24, a spot mode key 26, a flood mode key 28 and an on/off key 30 for providing for the functionality including turning the searchlight on/off, moving the searchlight up/down and left/right, moving the searchlight fast/slow, providing SOS signaling and centerline, providing spotlight or floodlight functionality, etc.

2-Speed Joystick 20

In operation, the 2-speed joystick 20 moves the searchlight up, down, left, right, and at 45 degrees angle, i.e. 45 degrees to the upper right, upper left, lower right, and lower left. In addition, the 2-speed joystick 20 provides the searchlight with a two-speed operation, including a slow speed when held for the first 3-5 seconds, a fast speed after 3-5 seconds, and a control resets operation back to slow speed when released by the user or operator. In operation, the 2-speed joystick 20 allows a searchlight selection of slow and fast speed rotational options to be chosen separately from the spot/flood beam options. In the prior art, the "slow speed/spot beam" and "fast speed/flood beam" have historically been linked in function.

According to the present invention, now the user or operator of the controller 12 can choose speed and beam pattern separately via the 2-speed joystick 20 and the "spot" and "flood" touch pad buttons or keys 26 or 28. The functionality of the 2-speed joystick 20 may be implemented in the 2-speed joystick module 54 in FIG. 3, consistent with that discussed below.

The aforementioned description of the 2-speed joystick 20 is provided by way of example only. The scope of the invention is not intended to be limited to any particular length of time or range of time that the user holds the 2-speed joystick to achieve the desired functionality; and embodiments are envisioned in which the 2-speed joystick is held for a different time, such as 1-3 second, 1-4 seconds, 2-4 seconds, etc. to achieve the desired functionality.

Moreover, 2-speed joysticks are known in the art and the scope of the invention is not intended to be limited to any particular type or kind thereof either now known or later developed in the future. In addition, a person skilled in the art would be able to adapt a known 2-speed joystick to implement and perform the functionality shown and described herein.

The SOS Key 22

In operation, when pressed by the user the SOS key 22 activates SOS signaling in the current lamp head position after a 2 second hold; a second press activates a 30 degrees incremental rotation and signaling function; and a third press cancels signaling and rotation and the searchlight stays on. The functionality of the SOS key 22 may be implemented in the SOS signaling module 56 in FIG. 3, consistent with that discussed below.

The aforementioned description of the SOS key 22 is provided by way of example only. The scope of the invention is not intended to be limited to any particular ordering of the functionality of the SOS key 22 when pressed, the length of time pressed or the number of degrees of the rotation. For example, embodiment are envisioned having a different ordering of the functionality of the SOS key 22 when pressed, a different length of time pressed, a different number of degrees of the rotation, or some combination thereof.

The Sweep Key 24

In operation, when pressed by the user the sweep key 24 activates a 20 degrees left/right sweep feature in spot/slow mode and activates motors and lamps/lights if not already on; while a second press deactivates the sweep function and the lamp stays on.

The aforementioned description of the sweep key 24 is provided by way of example only. The scope of the invention is not intended to be limited to any particular ordering of the functionality of the SOS key 24 when pressed, the length of time pressed or the number of degrees of the sweep. For example, embodiment are envisioned having a different ordering of the functionality of the sweep key 24 when pressed, a different length of time pressed, a different number of degrees of the sweep, or some combination thereof.

The Spot, Flood and On/Off mode Keys 26, 28, 30

The spot mode key 26, the flood mode key 28 and the on/off key 30 respectively switch the searchlight to a spot mode, a floodlight mode or power the lamps and motors on/off. In addition, the on/off key 30 also kills power to lamps and motors. Back lighting may be green when the power is "off" (same as other key or button); and amber with the power "on." This functionality may be implemented in the modules 60, 62, 64, consistent with that discussed below.

Moreover, the on/off key 30 may be pressed and held for 1 second to return the searchlight head to centerline. In this embodiment, if the lamp is "on", it will remain on after the light centers; if the light is off, the lamp head will center without activating the lamps; power to the motors will then turn off at the end of the movement. In effect, the "center home" feature that provides a user or boat owner with a one-touch controller pad function that returns the searchlight 10 to a customary forward pointing/on boat centerline searchlight position after use. This "center home" feature eliminates the need to attempt adjustment to the preferred centerline positioning using a joystick or 8-way touchpad when often the searchlight body cannot be seen by the operator. The functionality of the sweep key 24 may be implemented in the module 56 in FIG. 3, consistent with that discussed below. However, the scope of the invention is not intended to be limited to implementing the "center home" feature in the "on/off" key 30; embodiments are envisioned in which this feature is implemented in another key, such as the sweep key 24 or some other suitable key.

FIG. 3: The Searchlight Controller Module 14

FIG. 3 shows the searchlight controller module 14 in FIG. 1 in greater detail, which includes one or modules for performing the functionality shown and described in relation to the searchlight controller pad 12, the corresponding keypad 18, the 2-speed joystick 20, the SOS key 22, the sweep key 24, the spot mode key 26, the flood mode key 28 and the on/off key 30, for providing for the associated functionality including turning the searchlight on/off, moving the searchlight up/down and left/right, moving the searchlight fast/slow, providing SOS signaling, providing spotlight or floodlight functionality, etc.

By way of example, as shown the searchlight controller module 14 may include a control processor module 52, a 2-speed joystick module 54, an SOS signaling and rotational sweep module 56, a left/right sweep module 58, a spotlight module 60, a floodlight module 62, an on/off module 64, a power supply module 66, an input/output module 68 for providing signals to/from the searchlight controller pad 12 and the searchlight assembly 16, or some combination.

By way of example, the functionality of one or more of the modules shown in FIG. 3 may be implemented using hardware, software, firmware, or a combination thereof, although the scope of the invention is not intended to be limited to any particular embodiment thereof. In a typical software implementation, the modules would include one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future. Moreover, the scope of the invention is intended to include the modules being stand alone modules or one or more module having one or more of the aforementioned functionalities in the combination, or in combination with other circuitry (not shown herein) for implementing another module.

FIG. 4: The Searchlight Assembly 16

FIG. 4 shows the searchlight assembly 16 in FIG. 1 in greater detail, which includes a light assembly generally indicated as 70 and a searchlight up/down and left/right motorized assembly 72 having a mounting gasket 74, as best shown in FIGS. 4a, 4b, 4c.

As best shown in FIG. 4d, the light assembly 70 includes a head assembly 80 with a main housing 82 for receiving a halogen chassis assembly 84, a lens 86, an O-ring 88 and a ring 88. The light assembly 70 is arranged on the motorized assembly 72 in a manner suitable for moving the searchlight up/down and left/right, fast/slow, providing SOS signaling, providing spotlight or floodlight functionality, etc., consistent with that shown and described herein.

FIG. 5: The Searchlight Up/Down and Left/Right Motorized Assembly

FIG. 5 shows the searchlight up/down and left/right motorized assembly 72 in greater detail.

As shown in FIG. 5, the searchlight up/down and left/right motorized assembly 72 includes a bottom base 90, a bellows seal 92 and an up/down gear motor 94 arranged on a top base 95 and a head bracket 96 (see also FIG. 5), as well as a base rotation bushing 91 and a base thrust bushing 93. The up/down gear motor 94 is coupled to the sector gear 97 for providing the up/down movement of the head assembly 80 in response to rotational movement of the tilt motor pinion 99 of the motor 94.

The motorized assembly 72 also includes a base neck 98, a left/right motor 100, one or more PCB slip rungs 102, a PCB sensor 104 and an encoder tube 106, as well as a stud plate assembly 108 and a motor coupler 109. The left/right motor 100 is coupled to the encoder tube 106 for providing the left/right rotational movement of the head assembly 80 in response to rotational movement of a corresponding pinion (not shown) of the motor 100.

The scope of the invention is not intended to be limited to any particular way of arranging the light assembly 70 on the motorized assembly 72, or moving these elements in relation to one another, in order to implement and/or perform the aforementioned functionality. Moreover, embodiments of the present invention are also envisioned using other ways either known or later developed in the future for arranging a suitable light assembly like 70 on a suitable motorized assembly like 72, or moving such elements in relation to one another to achieve the same.

Finally, FIGS. 4 and 5 do not show a wire harness from the searchlight controller module 14 to the searchlight assembly 16 for providing the searchlight controller module signal along the line 14a to the same; however, a person skilled in the art would appreciate how to implement the same consistent with that shown and described herein. For example, the searchlight controller module signal along the line 14a may be provided to the gear motor 94 for controlling the up/down movement of the light assembly 70, and the motor 100 for controlling the left/right movement of the light assembly 70. Embodiments are also envisioned in which the searchlight controller module signal along the line 14a is coupled to a separate controller for the motorized assembly 72, which provides control signals to the motors 94 and 100 for controlling the movement of the light assembly 70.

Bayonet/Security Locking and Mounting System

Furthermore, the present invention also features a new and bayonet/security locking and mounting system, that includes a base member in the form of the stud plate assembly 108 (FIG. 5), a mounting plate 120 (FIG. 4d) and at least one locking bolt or mounting member 110. The base member 108 is coupled to the motorized assembly 72 and has the at least one mounting member 110 coupled thereto, as shown. The mounting plate 120 is for coupling the base 108 to a device (not shown), like to boat or the like, and has at least one aperture 121 for receiving the at least one mounting member 110. Each of the at least one locking bolt 110 is coupled through a respective one of the apertures 121, and the at least one locking bolt 110 requiring a special matching locking wrench (not shown) to tighten and loosen the same making theft of the searchlight from the device substantially more difficult. The mounting plate 120 may also includes a locking arrangement for coupling to the light to the device.

The present invention fills a need in the art to provide a that provides ease of installation by the Original Equipment Boat Manufacturers (OEMs) and anti-theft security for the end-user. The present invention provides a searchlight having a new and unique bayonet/security locking and mounting system that significantly reduces installation time and time to remove the searchlight for servicing.

Additional Features

Additional features that may be implemented in the searchlight according to the present invention include the following:
1) Up to two mode stations;
2) 12/24 volt operation;
3) Reverse polarity protection;
4) Resettable internal fusing;
5) Rotation speed: Fast 25-30 degrees per second, horizontal; slow 15-20 degrees per second, vertical; and
6) The controller may be waterproof.

The power supply module 66 may include circuitry to implement the 12/24 volt operation of the searchlight based on the requirements of the boat that the searchlight is being implement, as well as the reverse polarity protection. The power supply module 66 may include a resettable internal fusing.

The Scope of the Invention

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein without departing from the spirit and scope of the present invention.

We claim:

1. A light, including a searchlight, for mounting on a device or vehicle, including a boat, comprising:
   a keypad (18) having
      a spot mode key (26) configured to switch the light to a spot mode;
      a flood mode key (28) configured to switch the light to a flood mode; and
      a controller (20) configured to respond to a user holding the controller (20) for a first predetermined period of time and switch the light to a slow speed of rotational operation, and also configured to respond to the user holding the controller (20) for a different predetermined period of time than the first predetermined period of time and switch the light to a fast speed of rotational operation, so that the user can make a light selection of slow and fast rotational options separately from making a selection between spot and flood beam options.

2. The light according to claim 1, wherein the controller includes a two-speed joystick for providing the light selection of the slow and fast rotational options.

3. The light according to claim 1, wherein the first predetermined time is shorter than the different predetermined period of time.

4. The light according to claim 1, wherein the keypad has a key that returns the light to a customary forward pointing/on centerline position after use.

5. A light, including a searchlight or floodlight, for mounting on a device or vehicle, including a boat, comprising:
   a base being coupled to the light and having at least one mounting member;
   a mounting plate for coupling the base to the device, the mounting plate having at least one aperture for receiving the at least one mounting member;
   at least one locking bolt, each being coupling to a respective one of the at least one mounting member for fixedly coupling the mounting plate and the base, the at least one locking bolt being configured for requiring a special matching locking wrench to tighten and loosen the same making the removal of the light from the device substantially more difficult for anyone not having the special matching locking wrench.

6. The light according to claim 5, wherein the mounting plate includes a locking arrangement for coupling to the light to the device.

7. A light (10) for mounting on a device or vehicle, including a boat, comprising:
   a keypad (18) having
      one or more keys (20, 22, 24, 26, 28) configured to respond to a touch by a user and move the light to a position that is different than a customary forward pointing/on centerline position, and
      another key (30) configured to respond to the user holding the other key (30) down for a first predetermined period of time and perform one light function, and also configured to respond to the user holding the other key (30) down for a different predetermined period of time than the first predetermined period of time and return the light to the customary forward pointing/on centerline position after use.

8. The light according to claim 7, wherein the other key is an on/off key that turns the light on/off or returns the light to the customary forward pointing/on centerline position after use depending on the length of time the user presses the key.

9. The light according to claim 8, wherein if the light is "on", then the light will remain "on" after the light is centered; and if the light is "off", then the light will center without activating the light.

\* \* \* \* \*